(12) United States Patent
Cherry et al.

(10) Patent No.: US 11,033,014 B2
(45) Date of Patent: Jun. 15, 2021

(54) FISHING LINE MANAGEMENT DEVICE

(71) Applicants: Alexander D. Cherry, Garner, NC (US); Stephen P. Fazekas, Boca Raton, FL (US)

(72) Inventors: Alexander D. Cherry, Garner, NC (US); Stephen P. Fazekas, Boca Raton, FL (US)

(73) Assignee: A1S3, LLC, Boca Raton, FL (US)

( * ) Notice: Subject to any disclaimer, the term of this patent is extended or adjusted under 35 U.S.C. 154(b) by 224 days.

(21) Appl. No.: 16/299,712

(22) Filed: Mar. 12, 2019

(65) Prior Publication Data

US 2019/0281802 A1    Sep. 19, 2019

Related U.S. Application Data

(60) Provisional application No. 62/642,681, filed on Mar. 14, 2018.

(51) Int. Cl.
*A01K 91/047* (2006.01)
*A01K 91/08* (2006.01)
*A01K 91/04* (2006.01)

(52) U.S. Cl.
CPC ............ *A01K 91/047* (2013.01); *A01K 91/08* (2013.01); *A01K 91/04* (2013.01)

(58) Field of Classification Search
CPC ....... A01K 91/03; A01K 91/04; A01K 91/047
See application file for complete search history.

(56) References Cited

U.S. PATENT DOCUMENTS

| | | | | |
|---|---|---|---|---|
| 1,453,987 A * | 5/1923 | Mills | ...................... | A01K 95/00 43/43.1 |
| 2,789,386 A * | 4/1957 | Creelman | ................ | B63G 8/42 43/43.13 |
| 3,808,727 A * | 5/1974 | Flanders | ................ | A01K 91/08 43/43.13 |
| 3,872,617 A * | 3/1975 | Zalonis | .................. | A01K 95/00 43/43.13 |
| 3,940,871 A * | 3/1976 | Evans | .................... | A01K 91/08 43/43.13 |
| 3,971,154 A * | 7/1976 | Craig | ..................... | A01K 91/08 43/43.13 |
| 4,864,768 A * | 9/1989 | Schock | .................. | A01K 91/08 43/43.13 |
| 5,185,951 A * | 2/1993 | Hemmerle | ............. | A01K 91/08 43/43.13 |
| 5,355,615 A * | 10/1994 | Spickelmire | ........... | A01K 91/08 43/43.13 |
| 6,658,784 B1 * | 12/2003 | Mastropaolo | .......... | A01K 91/08 43/42.22 |

* cited by examiner

*Primary Examiner* — Timothy D Collins
*Assistant Examiner* — Madeline L Douglas
(74) *Attorney, Agent, or Firm* — Nicholas R. Lewis, P.A.

(57) ABSTRACT

A fishing line management device, including a body defining a passage therethrough, the body defining a first attachment point, a second attachment point, and first and second wings extending therefrom; a substantially triangular keel disposed within the passage; and a rudder movably coupled to the body. The rudder may be selectably positionable at a plurality of preset angular positions, wherein the rudder stays in place once positioned at one of the plurality of preset angular positions.

19 Claims, 4 Drawing Sheets

FISHING LINE MANAGEMENT DEVICE

CROSS-REFERENCE TO RELATED APPLICATION

This application is related to and claims priority to U.S. Provisional Patent Application Ser. No. 62/642,681, filed Mar. 14, 2018, entitled FISHING LINE MANAGEMENT DEVICE, the entirety of which is incorporated herein by reference.

STATEMENT REGARDING FEDERALLY SPONSORED RESEARCH OR DEVELOPMENT n/a

FIELD OF THE INVENTION

The present disclosure relates to devices and methods of use thereof for managing one or more fishing lines and related equipment and accessories from a marine vessel.

BACKGROUND OF THE INVENTION

Fishing is both an enjoyable pastime for significant portions of the population, as well as a commercial industry providing food to millions of people. Regardless of whether the motivation is recreational or commercial, trolling for fish using multiple lines is not without its entanglement difficulties and other shortcomings. For example, multiple lines may get tangled whenever there is a cross current or wind that pushes baits sideways. When trying to chase bait fish schools or follow a weed line, a boat operator would have to make large, wide turns to keep the lines from tangling. To avoid entangling multiple lines, a marine vessel may employ extensive outrigging or other costly equipment to keep the various lines separated from one another in the water, but such expensive equipment is out of reach for many individuals and smaller commercial fishing operations.

Another difficulty experienced during trolling includes trying to keep bait or lures at a consistent depth. Changes in underlying current and sea conditions, which can happen quickly and vary throughout a fishing region, typically have to be offset by changes in boat speed. Failure to adequately compensate for such changing conditions can result in the bait or lures breaching the surface of the water and skipping along, which can wear out or destroy the bait/lure (not to mention decrease the likelihood of catching larger fish who do not hunt near the surface), thus requiring time and expense to re-bait/lure the lines. The present disclosure addresses these shortcomings.

SUMMARY OF THE INVENTION

The present disclosure advantageously provides a fishing line management device, including: a body defining a passage therethrough, the body defining a first attachment point, a second attachment point, and first and second wings extending therefrom; a substantially triangular keel disposed within the passage; and a rudder movably coupled to the body. The first attachment point may include an eyelet positioned proximate a front end of the body. The second attachment point may include an eyelet positioned proximate a rear end of the body. The rudder may be selectably positionable at a plurality of preset angular positions, and the rudder may stay in place once positioned at a preset angular position. Each of the first and second wings may form an angle between approximately eight degrees and approximately twelve degrees with respect to a longitudinal axis of the body. The device may include a weight releasably secured to the body. The weight may be threadably coupled to a section of the body, wherein the section defines an exterior shape substantially similar to a shape and/or dimension of the weight. The passage may have a substantially cylindrical shape. The keel may form an angle at a front end of the device between approximately one degree and approximately fifteen degrees. The body of the device may define a total length between approximately four inches and approximately twelve inches. The body of the device may define a total width from the first wing to the second wing between approximately two inches and approximately twelve inches.

A method of managing a plurality of fishing lines is disclosed, including: attaching a first fishing line to a first attachment point of a first fishing line management device, wherein the first fishing line management device includes: a body defining a passage therethrough and first and second wings extending therefrom; a substantially triangular keel disposed within the passage; and a rudder movably coupled to the body; attaching at least one of a fishing hook, fishing lure, and fishing bait to a second attachment point of the first fishing line management device; adjusting an angular position of the rudder of the first fishing line management device; attaching a second fishing line to a first attachment point of a second fishing line management device, wherein the second fishing line management device includes: a body defining a passage therethrough and first and second wings extending therefrom; a substantially triangular keel disposed within the passage; and a rudder movably coupled to the body; attaching at least one of a fishing hook, fishing lure, and fishing bait to a second attachment point of the second fishing line management device; and adjusting an angular position of the rudder of the second fishing line management device. Each of the first attachment points may include an eyelet positioned proximate a front end of the first and second fishing line management devices. Each of the second attachment points may include an eyelet positioned proximate a rear end of the first and second fishing line management devices. Each of the first and second wings may form an angle between approximately eight degrees and approximately twelve degrees with respect to a longitudinal axis of the bodies of the first and second fishing line management devices. The first fishing line management device may include a first weight releasably secured to the body. The second fishing line management device may include a second weight releasably secured to the body. The first weight may have a mass different than a mass of the second weight. The body of the first fishing line management device may define a total length between approximately four inches and approximately twelve inches. The body of the first fishing line management device may define a total width from the first wing to the second wing between approximately two inches and approximately twelve inches.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE INVENTION

Figure 1:
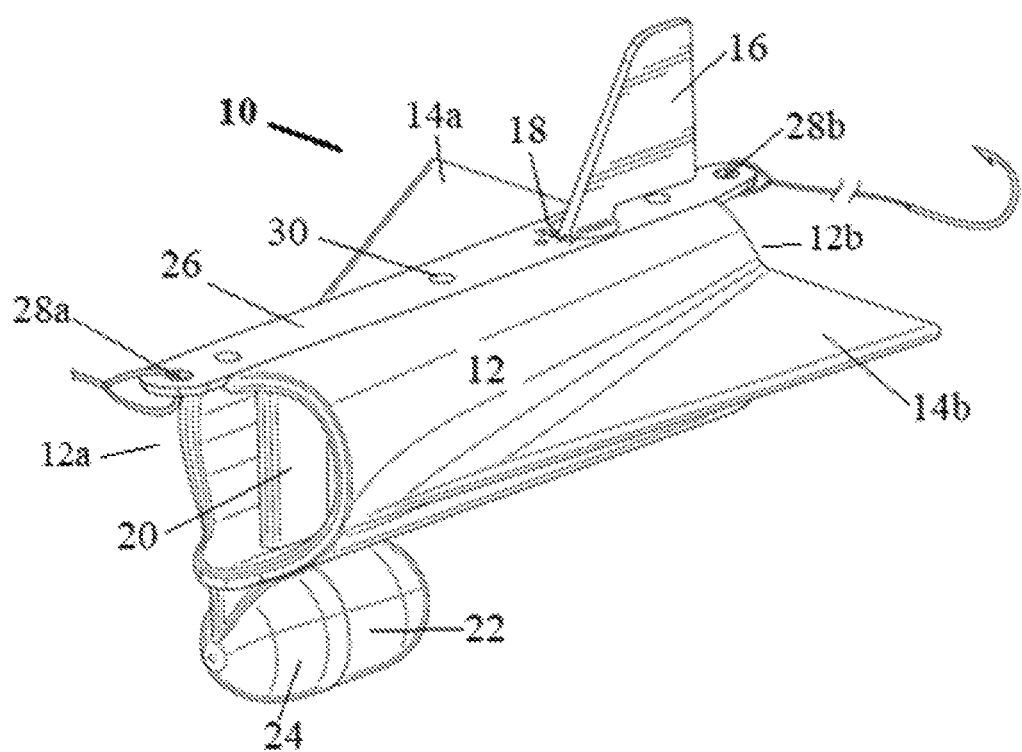
FIG. 1 is an illustration of an example of a fishing line management device constructed in accordance with the principles of the present disclosure.
Figure 2:
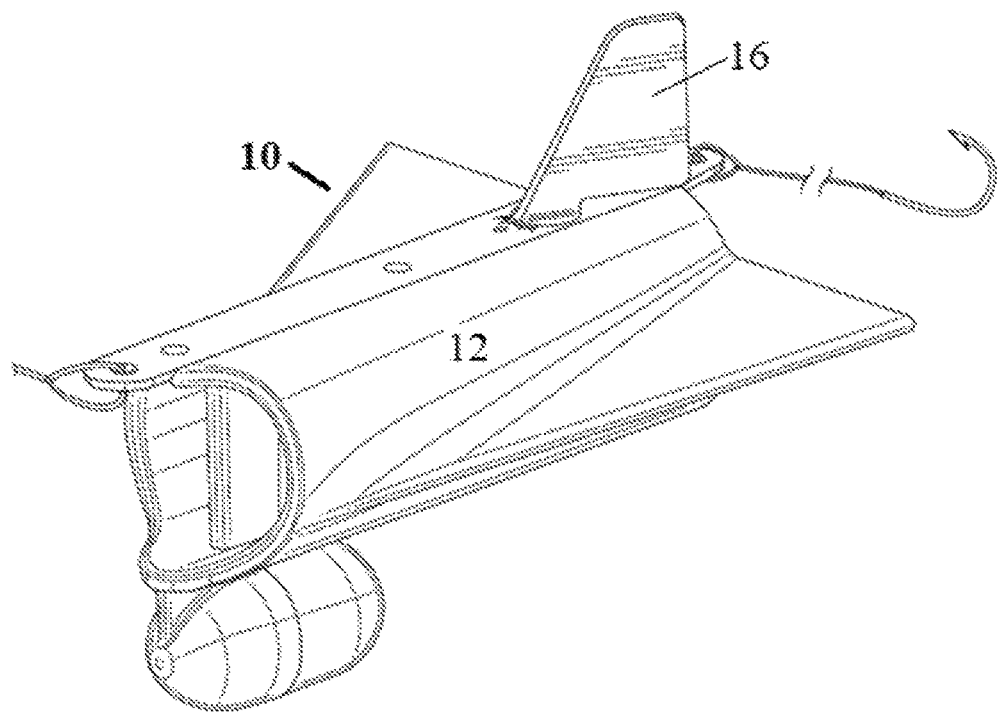
FIG. 2 is another illustration of the fishing line management device of FIG. 1 with an adjusted rudder position.
Figure 3:
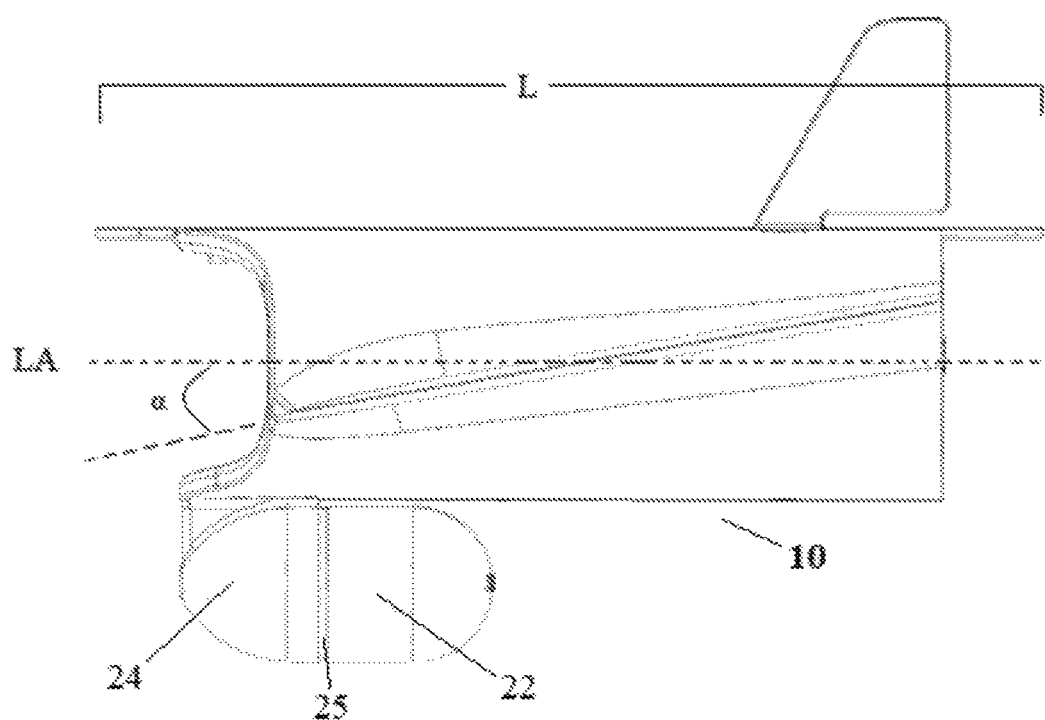
FIG. 3 is a side view of the fishing line management device of FIG. 1.
Figure 4:
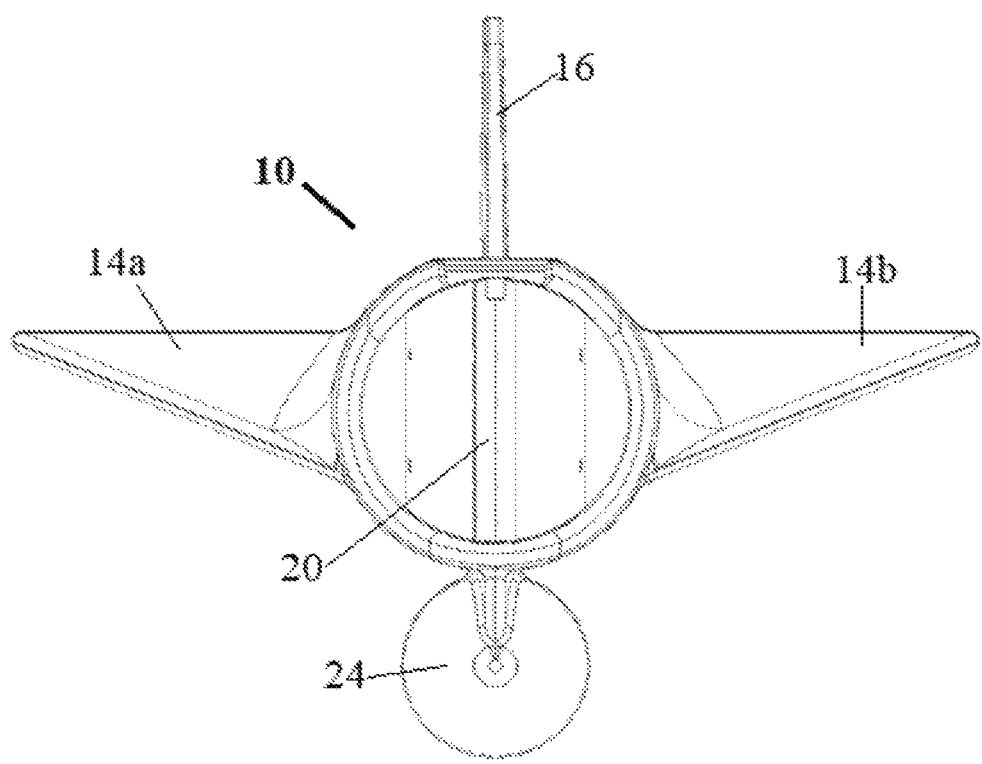
FIG. 4 is a front view of the fishing line management device of FIG. 1.
Figure 5:
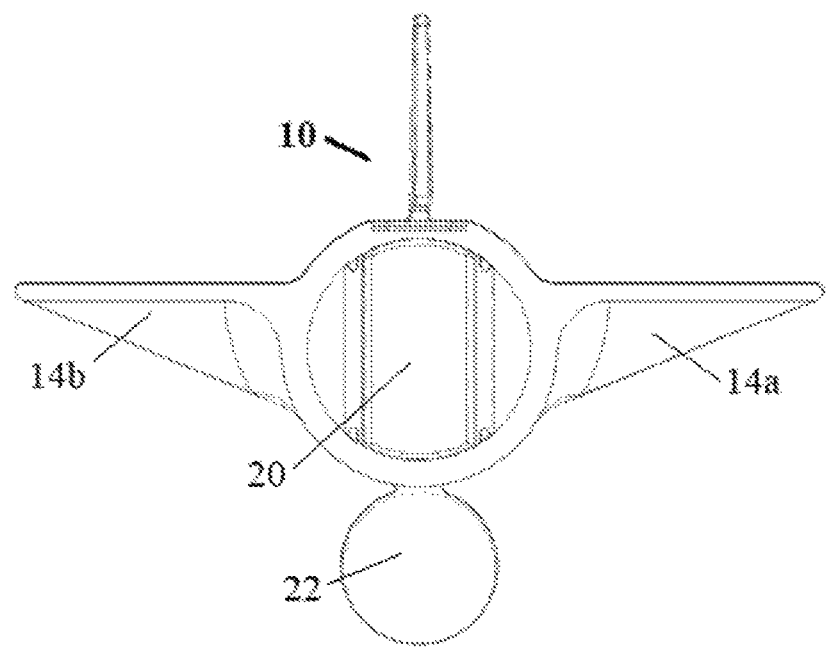
FIG. 5 is a rear view of the fishing line management device of FIG. 1.
Figure 6:
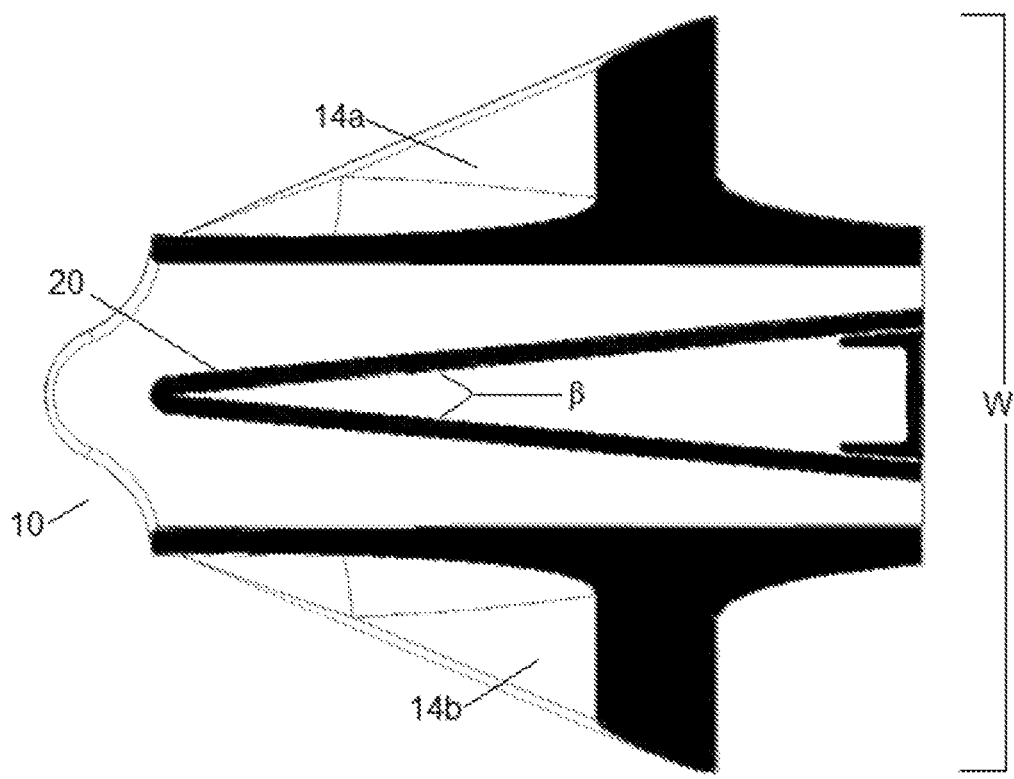
FIG. 6 is a top cross-sectional view of the fishing line management device of FIG. 1 taken along the longitudinal axis 'LA' of FIG. 3.

The present disclosure provides fishing line management devices and methods of use thereof that allow multiple lines to be readily used to troll for fish from a marine vessel with significantly decreased or altogether eliminated risk of fishing line entanglement, while also providing ease of use in maintaining a substantially consistent trolling depth for the bait/lure being used. The fishing line management devices and methods disclosed herein can provide such benefits at a cost far below the expense of complex outrigging systems, and do not require any modification of a particular marine vessel being used.

Now referring to FIGS. 1-6, an example of a fishing line management device 10 is shown. The device 10 generally defines or includes a body 12 that is sized and shaped to be coupled to a fishing rod or reel and pulled through the water. For example, the body 12 may generally define a hydrodynamic fuselage-type shape that is substantially cylindrical and defining a passage along a longitudinal axis 'LA' extending from the front of the device 12a to the rear of the device 12b. The body 12 may have an overall length 1' ranging between approximately four inches and approximately twelve inches, and/or may be varied outside this size range for particular applications or use. The body of the device may define a total width 'W' from the first wing to the second wing between approximately two inches and approximately twelve inches The body 12 may include and/or be coupled to one or more wings 14a, 14b (collectively, "14") that extend outward. The wings 14 may be angled downward with respect to the longitudinal axis 'LA' of the body 12 to provide a measure of descent in the water during use, as described herein. For example, the wings 14 may define an angle α between approximately eight degrees and approximately twelve degrees with respect to the longitudinal axis 'LA.' Alternative angular orientations may be implemented to provide a desired running depth at a particular speed or range of speeds, and with particular bait, lures, and/or weights. Moreover, the wings 14 may have a selectively adjustable angular orientation with respect to the body 12 to allow a user to set the angle, and thus the running depth or descent of the device 10, during use. Such selective adjustability may be provided through a hinge, pivot point or other adjustable mechanism (not shown) coupling the wings 14 to the body 12.

The device 10 may further include a rudder 16 that is substantially vertically oriented and coupled to an upper portion of the body 12 towards the rear of the device 10. The rudder 16 may be pivotable or rotatable with respect to the body 12 to provide varying angles of user-selectable orientation and resulting steering or trailing of the device 10 when in use. The angular orientation of the rudder 16 may be selectively adjustable through the use of one or more springs, bushings, or resistance elements, and/or through the use of one or more set screws, fasteners, or other releasably securable mechanisms, such that the rudder 16 stays substantially in place once it is positioned at a desired angular position with respect to the body 12. An angle reference indicator 18 may be positioned proximate to the rudder 16 and provide a visual reference point or scale to determine or set a particular angular orientation of the rudder 16 with respect to the body 12 and/or a longitudinal axis thereof.

The device 10 may further include a substantially triangular or V-shaped keel 20 disposed within an interior passage of the body 14. The keel 20 may extend substantially along the length of the body 12, with a narrower point or section of the keel positioned at the front 12a of the device 10, and extending outward to a wider section towards the rear 12b of the device 10. The keel may form an angle β at a front end of the device between approximately one degree and approximately fifteen degrees. During use, water flows through the space between the keel 20 and the inner wall or circumference of the body 12 to provide stability along pitch and roll axes of the device 10.

One or more weights 22 of varying mass may be selectively attached to the body 12 of the device 10 to provide a desired trolling depth of the device 10 during use. In the example shown, the weight 22 may be secured to a complimentary section 24 of the body 12. The section 24 may, for example, have a rounded exterior shape substantially similar to a shape and/or dimension of the weight 22, and receive the weight 22 through a threaded interlocking engagement. The threaded engagement allows a user to easily and quickly select and/or swap out weights of varying mass for a particular use with the body 12 (e.g., for a particular bait, lure, for particular sea conditions, and/or for a particular trolling speed). Examples of appropriate weight values may be between approximately 2.5 ounces to approximately 8 ounces. Alternative releasably securing mechanisms may be implemented to couple the weight(s) 22 to the receiving section 24, such as interlocking tabs, clips, or the like. A cushioning and/or sealing element 25 may be positioned in between or otherwise in proximity to the weight 22 to reduce vibration noises between the weight and the body of the device 10 when in use. Such vibration noises or 'chatter' could draw fish to the device 10 rather than a lure or bait attached to the device 10. The cushioning and/or sealing element 25 may include, for example, one or more rubber washers, grommets, or other softened and/or pliable elements to absorb or bolster against movement and associated noises of the weight 22.

The device 10 may be constructed from one or more plastics, polymers, metals, and/or combinations and composites thereof. For example, the body 12 may be made from one or more durable plastics, while other portions may be made from metal, such as stainless steel, to resist corrosion and wear from use in saltwater as well as to provide stronger anchor or attachment points for the various components described herein, as well as attachment to other fishing equipment, baits, and/or lure. In the illustrated example, the device 10 includes a top plate 26 that extends along the length of the body 12. The top plate 26 made be constructed from one or more metals, and provide an attachment point for the rudder 16, and further provide attachment points and/or eyelets 28a, 28b for fishing lines leading to the rod/reel being used, and the bait or lure being employed, respectively. The top plate 26 may be secured to the body 12 of the device 10 through an adhesive, welding, and/or one or more fasteners 30. Portions of the device 10 may be colored to blend in or otherwise camouflage the device 10 for use in particular water conditions, e.g., to render the device 10 less visible to fish so that fish are drawn to the lure or bait being used rather than the device 10 itself. For example, varying degrees of opaqueness and/or transparency may be implemented, in addition and/or alternatively to varying color selection (e.g., blue, green, brown, etc.).

Figure 7:
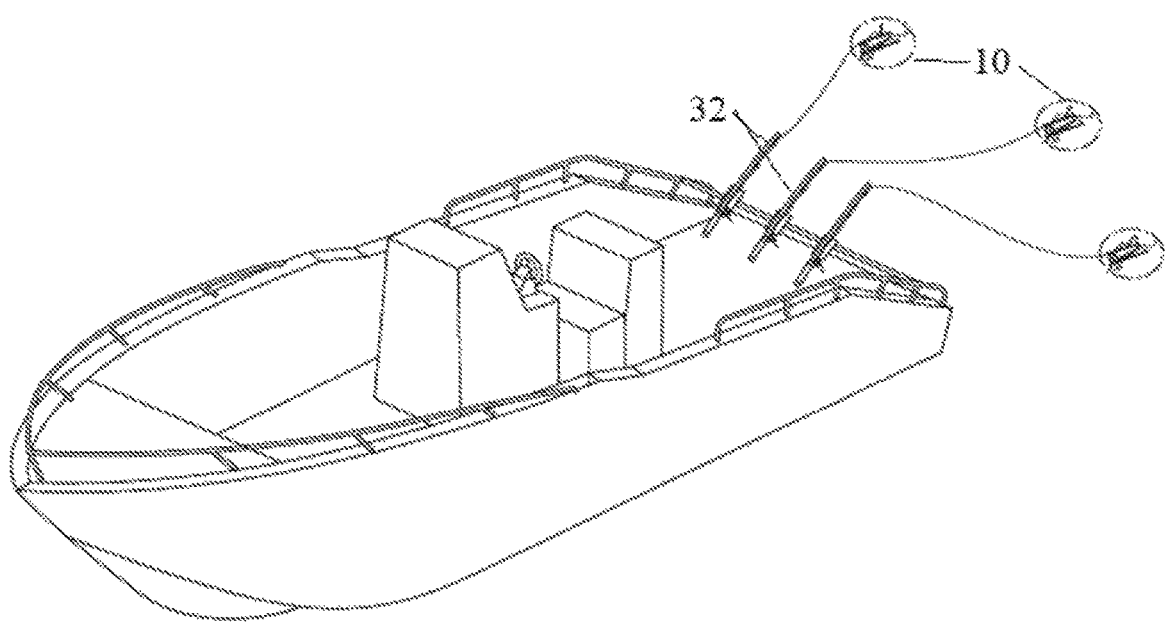
FIG. 7 is an illustration of an example of multiple fishing line management devices constructed and operated with a marine vessel in accordance with the principles of the present disclosure.

Now turning to FIG. 7, one or more fishing line management devices 10 may be used in connection with one or more fishing rods and reels 32 to troll from a marine vessel with reduced risk of entanglement and at consistent running depths for the device and attached bait or lures. In an exemplary use, a fishing line extending from a fishing rod or reel 32 may be attached to front 12*a* of the body 12 of the device 10, such as at the front attachment point 28*a*. The desired bait and/or lure may be attached to the rear 12*b* of the device 10, such as at the attachment point 28*b*. A desired weight 22 may be attached to the body 12, taking into account the particular sea conditions, bait, lure, and/or trolling speed, to provide a desired trolling depth. The rudder 16 may be angularly oriented with respect to the body 12 to provide a trolling angle of the device 10 (and thus the attached bait/lure) while in the water, e.g., changing the angle of the rudder 16 with respect to the body 12 changes the resistance to the water while trolling, resulting in the device 10 sweeping out at an angle from the marine vessel, rather than being towed directly behind the vessel. When using multiple lines and rods, each device 10 may have its rudder 16 positioned at a different angle compared to the angles of the rudders of the other devices on the other rods, to thus provide an angled, spaced trolling pattern for the resulting baits/lures. The selectively adjustable angular orientation, and thus controllably spaced trolling pattern, reduces the likelihood of entanglement, and does so without requiring modifications to the vessel, or requiring costly outrigging equipment.

It will be appreciated by persons skilled in the art that the present disclosure is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the examples disclosed herein are not necessarily exclusive of each other and may be included in a variety of different combinations or configurations without departing from the scope and spirit of the disclosure. A variety of modifications and variations are possible in light of the above teachings without departing from the scope and spirit of the disclosure, which is limited only by the following claims.

What is claimed is:

1. A fishing line management device, comprising:
    a body defining a passage therethrough, wherein the passage is centered within a width of the body and extends along a central longitudinal axis thereof, the body defining a first attachment point, a second attachment point, and first and second wings extending therefrom;
    a substantially triangular divider disposed within the passage; and
    a rudder movably coupled to the body.

2. The device of claim 1, wherein the first attachment point includes an eyelet positioned proximate a front end of the body, and wherein the second attachment point includes an eyelet positioned proximate a rear end of the body.

3. The device of claim 1, wherein the rudder is selectably positionable at a plurality of preset angular positions, and wherein the rudder stays in place once positioned at one of the plurality of preset angular positions.

4. The device of claim 1, wherein each of the first and second wings form an angle between approximately eight degrees and approximately twelve degrees with respect to a longitudinal axis of the body.

5. The device of claim 1, further comprising a weight releasably secured to the body.

6. The device of claim 5, wherein the weight is threadably coupled to a section of the body, and wherein the section defines an exterior circumference substantially equal to an exterior circumference of the weight.

7. The device of claim 1, wherein the passage has a substantially cylindrical shape.

8. The device of claim 1, wherein the body of the device defines a total length between approximately four inches and approximately twelve inches.

9. The device of claim 8, wherein the body of the device defines a total width from the first wing to the second wing between approximately two inches and approximately twelve inches.

10. A fishing line management device, comprising:
    a body defining a passage therethrough, the body defining a first attachment point, a second attachment point, and first and second wings extending therefrom;
    a substantially triangular divider disposed within the passage, wherein the divider forms an angle at a front end of the device between approximately one degree and approximately fifteen degrees; and
    a rudder movably coupled to the body.

11. A method of managing a plurality of fishing lines, comprising:
    attaching a first fishing line to a first attachment point of a first fishing line management device, wherein the first fishing line management device includes:
        a body defining a central passage therethrough and first and second wings extending therefrom;
        a substantially triangular divider disposed within the passage; and
        a rudder movably coupled to the body;
    attaching at least one of a fishing hook, fishing lure, and fishing bait to a second attachment point of the first fishing line management device;
    adjusting an angular position of the rudder of the first fishing line management device;
    attaching a second fishing line to a first attachment point of a second fishing line management device, wherein the second fishing line management device includes:
        a body defining a central passage therethrough and first and second wings extending therefrom;
        a substantially triangular divider disposed within the passage; and
        a rudder movably coupled to the body;

attaching at least one of a fishing hook, fishing lure, and fishing bait to a second attachment point of the second fishing line management device; and adjusting an angular position of the rudder of the second fishing line management device.

12. The method of claim 11, wherein each of the first attachment points include an eyelet positioned proximate a front end of the first and second fishing line management devices.

13. The method of claim 12, wherein each of the second attachment points include an eyelet positioned proximate a rear end of the first and second fishing line management devices.

14. The method of claim 11, wherein each of the first and second wings form an angle between approximately eight degrees and approximately twelve degrees with respect to a longitudinal axis of the bodies of the first and second fishing line management devices.

15. The method of claim 11, wherein the first fishing line management device further includes a first weight releasably secured to the body.

16. The method of claim 15, wherein the second fishing line management device further includes a second weight releasably secured to the body.

17. The method of claim 16, wherein the first weight has a mass different than a mass of the second weight.

18. The method of claim 11, wherein the body of the first fishing line management device defines a total length between approximately four inches and approximately twelve inches.

19. The method of claim 18, wherein the body of the first fishing line management device defines a total width from the first wing to the second wing between approximately two inches and approximately twelve inches.

* * * * *